(12) United States Patent
Staicouras

(10) Patent No.: US 6,188,849 B1
(45) Date of Patent: Feb. 13, 2001

(54) CAMERA STABILIZER

(76) Inventor: Elias Staicouras, Terrangvagen 80, S-129 47, Hagersten (SE)

(*) Notice: Under 35 U.S.C. 154(b), the term of this patent shall be extended for 0 days.

(21) Appl. No.: 09/043,806

(22) PCT Filed: Feb. 5, 1997

(86) PCT No.: PCT/SE97/00174

§ 371 Date: Mar. 25, 1998

§ 102(e) Date: Mar. 25, 1998

(87) PCT Pub. No.: WO97/29317

PCT Pub. Date: Aug. 14, 1997

(30) Foreign Application Priority Data

Feb. 6, 1996 (SE) .................................................... 9600430

(51) Int. Cl.⁷ ................................................................ G03B 17/24
(52) U.S. Cl. ............................................................................ 396/421
(58) Field of Search .................................... 396/419, 420, 396/421, 428

(56) References Cited

U.S. PATENT DOCUMENTS

| 4,946,272 | 8/1990 | Brown . | |
|---|---|---|---|
| 5,098,182 | * 3/1992 | Brown | 396/421 |
| 5,229,798 | 7/1993 | Brown . | |
| 5,360,196 | 11/1994 | DiGiulio et al. . | |
| 5,842,859 | * 4/1998 | Acker | 396/421 |

\* cited by examiner

*Primary Examiner*—David M. Gray
(74) *Attorney, Agent, or Firm*—Fasth Law Offices; Rolf Fasth

(57) ABSTRACT

A camera stabilizer includes a camera attachment (22), an arm system (21, 5) carried by the attachment (22), a stabilising mass (6) which is carried by the outer free end-part of the arm system, and a handle (3) connected to the attachment (22) through the medium of a universal joint (32). The arm system includes two arm-parts (21, 5) which are collapsibly connected to one another through the medium of a pivot joint. The pivot joint is a vertical pivot joint that enables the arm-parts (21, 5) to be swung relative to one another in the horizontal plane, wherein the pivot joint includes means (44) for locking the arm-parts (21, 5) in selected horizontal angles relative to one another.

7 Claims, 1 Drawing Sheet

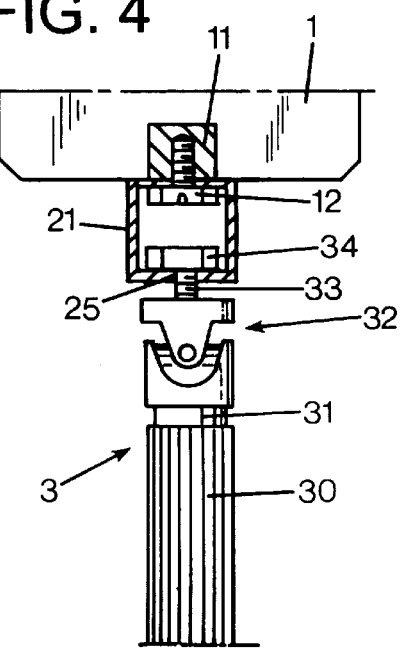
FIG. 1
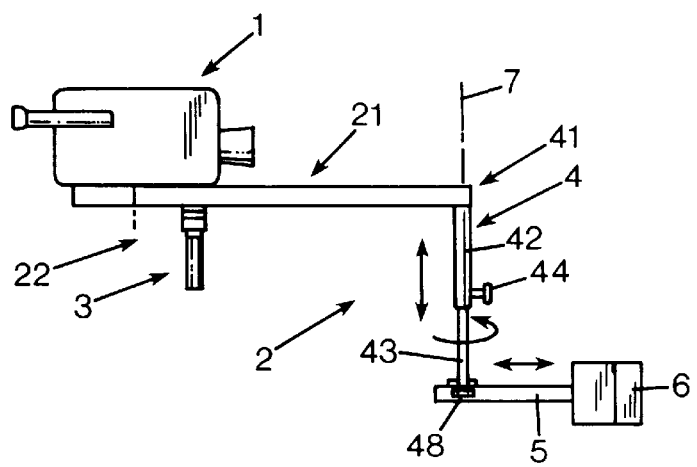
FIG. 2
FIG. 3
FIG. 4
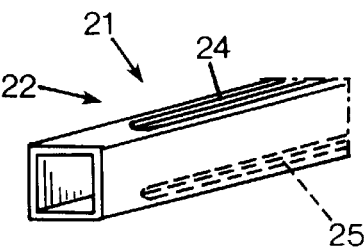
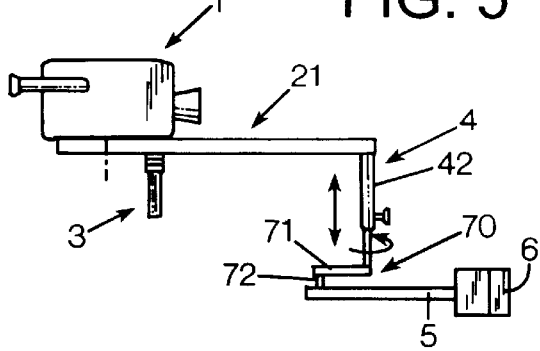
FIG. 5

CAMERA STABILIZER

The invention relates to a camera stabilizer of the kind defined in the preamble of claim 1.

The invention thus relates to a camera stabilizer, for instance a film camera stabilizer or a video camera stabilizer.

A video camera stabilizer or like camera stabilizer is known from U.S. Pat. No. 5,229,798. The known stabilizer includes a camera attachment that enables the camera to be mounted on the upper side of the attachment, an attachment-carried arm system which when the stabilizer is positioned for use extends at least vertically away from the attachment. The arm system carries a stabilising weight or mass at its outer end. The stabilizer also includes a handle, which is connected to the attachment means through the medium of a universal joint that prevents unintentional transmission of angular movement of the handle in relation to the vertical to the camera. Thus, the camera can be carried by means of the stabilizer handle with the camera constantly steady and without the "wobbling" movements of the camera operator being transferred to the camera.

A fundamental principle of the camera stabilizer is that it carries an inertial mass at a relatively long distance from the common centre of gravity of the camera and the stabilizer, so as to require the application of a comparatively large torque or turning moment to change the orientation of the camera. Because pivotal movement or down-folding movement of the handle is not transmitted to the camera and the remaining parts of the stabilizer, the camera pictures will have significant stability even when the camera is carried by the stabilizer handle while taking pictures.

The stabilizer known from U.S. Pat. No. 5,229,798 includes an arm system that has a horizontal axle which enables the arm system to be folded from a working position to a storage position in the vertical plane, wherein a monitor and a battery box are placed in front of the objective lens of the camera and its ocular end. The handle is connected to a fixed point in the attachment, in a horizontal plane. The camera is supported by the attachment through the medium of a so-called X-Y table, which enables the camera to be moved horizontally in relation to the handle and to said mass to a position in which the stabilizer holds the camera balanced horizontally.

In order to enable stabilisation to be effected also in the Z direction, one end of the stabilizer handle has a threaded peg or stud that engages with a corresponding sleeve on the attachment, wherein the sleeve axis is perpendicular to the plane of the X-Y table so as to enable the handle pivot point to be moved vertically in relation to the camera.

This known stabilizer has certain drawbacks. For instance, the X-Y table is an expensive and complex device and has a relatively large overall height and relatively short adjustment distances from the handle connection point. In turn, this results in the stabilizer mass being insufficiently large to provide for static balancing of those cameras whose centres of gravity lie at a relatively large horizontal distance from the point at which the handle is connected to the attachment. This drawback is particularly manifested by the requirement for the mass to be placed in the proximity of a vertical axis through the handle pivot.

Accordingly, the object of the present invention is to provide a low-weight stabilizer that is relatively uncomplicated and that affords simple static balancing of the camera even when the centre of gravity of the camera is located at a relatively long distance from the camera attachment point to the stabilizer attachment.

Further objects of the invention will be apparent from the following text.

The object of the invention is achieved with a stabilizer having the features set forth in the accompanying claim 1.

Further embodiments of the inventive stabilizer arrangement will be evident from the accompanying dependent Claims.

One significant feature of the invention is that the arm system that carries the stabilising inertial or sluggish mass at a horizontal and vertical distance is divided into two arm parts through the medium of a pivot joint that enables the outer arm part, which carries the mass, to be swung horizontally in relation to the inner arm part, which is connected to the attachment.

This enables the stabilizer attachment to be given a very simple and robust construction. For instance, when the arm-part connected to the attachment extends in the longitudinal direction of the camera, it suffices to permit the handle to be displaceable in its longitudinal direction in order to balance the camera in this direction. The camera can be balanced in the direction perpendicular to this direction in the horizontal plane, by swinging the outer arm-part horizontally and optionally also displacing said arm-part in the direction of its longitudinal axis, such that the outer arm-part will generate a turning moment or torque that adjusts the camera in the horizontal plane and also in the lateral direction of the camera.

By giving the vertical pivot means of the arm-parts the form of a telescopic arm, suitable balancing of the camera can also be ensured in the Z direction, by varying the length of the vertical telescopic arm.

The invention thus provides a simple and robust construction that includes long adjustment distances for balancing the stabilizer and the camera in relation to the handle joint. The camera position relative to the longitudinal extension of the arm can also be readily adjusted.

Transmission of rotary or pivotal movements from the handle-gripping part to the camera and to the stabilizer arrangement can also be prevented by providing a pivot joint, e.g. a slide bearing or a ball bearing, between the handle gripping part and the universal joint.

The simplified attachment of the inventive stabilizer system enables the attachment to be formed in principle by a square profile provided with slots in two mutually opposing side surfaces. This enables the camera to be mounted on an upper profile side with the aid of a screw that is passed through the slot from within and screwed into the threaded mounting bush of the camera with the aid of a screwdriver inserted into the interior of the hollow profile through the slot on the opposite side thereof.

The connecting end of the handle may carry a screw which is inserted through the slot in the bottom side-surface of the hollow profile and screwed into a nut located within said profile, wherein said nut may optionally be held against rotation by coaction with imperforate side-walls of the profile. This enables the handle to be readily unscrewed from its nut and displaced along the slot to a desired position along the hollow profile, where the handle can then readily be screwed securely by gripping and rotating its universal joint such as to screw the screw into the nut. The arm-parts of the inventive stabilizer arrangement and the telescopic arm that extends vertically between said arm-parts will preferably be releasable from one another or collapsible in relation to each other such that in a dismantled state, the stabilizer will comprise essentially a bundle of mutually parallel and mutually adjacent straight arm parts.

In one embodiment, the vertically positioned telescope arm may be extended with the aid of a crank means that enables the region of the effective radius of the outer arm-part to be increased from the vertical axis represented by the telescopic arm.

The mass, or weight, may typically comprise the batteries required to operate the camera, wherein current conductors may extend along the stabilizer arms, from a battery box located on the free end of the stabilizer arrangement to camera-mounted current connection means.

The invention will now be described with reference to exemplifying embodiments thereof and also with reference to the accompanying drawing.

FIG. 1 is a side view of an inventive camera stabilizer.

FIG. 2 is a horizontal view of the stabilizer shown in FIG. 1.

FIG. 3 illustrates a stabilizer attachment.

FIG. 4 illustrates mounting of the camera and the handle to the attachment.

FIG. 5 illustrates schematically a further embodiment of the inventive stabilizer.

FIG. 1 shows a video camera 1 mounted on a stabilizer 2. The stabilizer 2 includes a straight first hollow profiled section 21 of square cross-section 21.

The left end-part of the profiled section 21 forms an attachment 22 for the camera 1 and a handle 3. The right end of the profiled section 21 is connected to a vertically dependent telescopic rod 4, which is connected to the profiled section 21 through the medium of connector means 41. The telescopic rod 4 includes a tubular part 42 and a rod-part 43 which is movable in the tubular part 42. The parts 42, 43 can be locked relative to one another with the aid of locking means 44 with which the length of the arm 4 and the mutual positions of rotation of the parts 42, 43 relative to the axis of the arm 4 can be determined. The rod-part 43 carries at its bottom end a horizontal rod 5 whose outer end carries an inertial mass or weight 6. The mass may be formed by a battery box housing the batteries required to operate the camera; in other words, the batteries that are normally placed in the camera battery compartment are now placed in the box 6 and connected electrically to the camera 1 through the medium of conductors not shown.

The effective length of the arm 5 from the axis 7 is defined by the arm 4. Extending along the arm 5 is a slot through which the bottom end-part of the rod-part 43 extends so as to enable the effective length of the arm 5 to be adjusted, wherein the arm 5 can be locked onto the rod-part 43 by locking means 48 when the box 6 is positioned at a selected horizontal distance from the rod-part 43.

It will be seen from FIG. 2 that the arm-part 5 can be swung in the horizontal plane, so as to generate a turning moment of selectable magnitude about the longitudinal axis of the hollow profiled section 21.

The handle 3 can be moved along the hollow profile 21 to enable the camera 1 to be balanced about a horizontal axis that extends perpendicular to the axis 8 and extends through the point of connection of the handle 3 to the hollow profile 21.

The connection of the camera 1 to the attachment 22 can also be moved along the hollow profile 21.

As will be seen from FIG. 3, the attachment 22 of the hollow profile 21 is formed by a slot 24 that extends longitudinally along the upper surface of the hollow profile 21, and a slot 25 that extends longitudinally in the bottom surface of said hollow profile.

As shown in FIG. 4, the camera 1 has an internally threaded bush 11 into which a screw 12 can be screwed with the aid of a screwdriver inserted through the bottom slot 25.

It will also be seen from FIG. 4 that the handle 3 has an elongated hand grip 30 which carries a universal joint 32 through the medium of a pivot journal 31, in the present case a roller bearing/ball bearing. The universal joint 32 carries, in turn, a screw 33 that extends through the bottom slot 25 of the hollow profile 21 and coacts with a nut 34. The nut may be held against rotation by the side walls of the hollow profile. The shaft of the universal joint 32 may also be journalled through the medium of a roller bearing/ball bearing. The handle 3 can be locked to the attachment in a selected position along the slot 25, by finger-turning the universal joint 32 so as to clamp the bottom wall of the hollow profile 21 between the universal joint 32 and the nut 34.

Naturally, the camera 1 can also be moved to a desired position along the slot 24 and secured in this position by means of the screw 12.

In the FIG. 5 embodiment, a crank means 70 is connected between the bottom end of the vertical telescopic arm 4 and the inner end of the outer arm-part 5. The crank means 70 includes a horizontal arm-part 71 and a vertical arm-part 72, wherein the vertical arm-part 72 may be connected rotatably to the horizontal arms 71, 5 and locked in relation thereto. The crank means 70 functions to increase the region of the effective radius of the arm 5 from the vertical axis defined by the arm 4.

It will be evident from FIG. 1 for instance, that the person using the stabilizer is able to easily carry the camera and the stabilizer through the medium of the handle 3 without rotary movements or collapsing movements of the hand grip 30 being transmitted to the camera 1. It will also be evident that the vertical pivot axis 7 between the arm-parts 21, 5 in combination with the vertical arm-part 4 enable the stabilizer arrangement to be constructed so as not to impede alignment of the camera or to impede translation of the camera.

Although it has been inferred in the aforegoing that the camera 1 is aligned longitudinally in parallelism with the first arm-part 21, it will be apparent that the camera can be given any desired orientation with respect to the relationship of its longitudinal axis to the first arm-part 21.

The above description has been based on the assumption that the camera 1 shall be brought to a horizontal position, i.e. given a stable position with the camera image edges vertical and horizontal, wherein the directions given with respect to the various arms of the stabilizer refer to this horizontal position of the camera 1.

The length of the telescopic arm 4 can be adjusted vertically, so as to enable the camera 1 to be stabilised in the Z direction.

Although the arm 4 has been described as being telescopic in the aforegoing, it will be evident that the arm 4 may equally as well be comprised of generally vertical arm-parts that can be moved axially in relation to one another and detachably fixed in chosen positions.

The arms 21, 4, 5 and optionally also the arms 71, 72 may be detached from one another, in order to facilitate storage and transportation of the stabilizer. Alternatively, the arm-parts may be mutually hinged by means of lockable hinge means so as to enable the arm-parts to be collapsed, as an alternative to dismantling said arm-parts.

What is claimed is:

1. A camera stabilizer, comprising:

a first arm member having a camera attachment;

a handle attached to the first arm member via a universal joint;

a vertical pivot member attached to the first arm member;

a second arm member attached to the vertical pivot member so that the second arm member is swingable relative to the first arm member in a horizontal plane, the second arm member being movable into a collapsed position relative to the first arm member, the second arm member having an outer free end, the second arm member being parallel to the first arm member, the second arm member having an elongate groove defined therein to shiftably receive the vertical pivot member so that the vertical pivot member is shiftable along the elongate groove to adjust an effective length of the second arm member protruding outwardly from the vertical pivot member;

a locking member in operative engagement with the vertical pivot member to lock the first arm member in a selected horizontal angle relative to the second arm member; and a stabilizing mass member attached to the outer free end of the second arm member.

2. The camera stabilizer according to claim 1 wherein the first arm member has a first elongate aperture and a second elongate aperture defined therethrough, the first elongate aperture is used to secure a camera at selected positions along the first arm member and the second elongate aperture is used to secure the handle at selected positions along the first arm member.

3. The camera stabilizer according to claim 2 wherein the first arm member is a rectangular hollow profile and the first elongate aperture is disposed at a first side of the first arm member and the second elongate aperture is disposed at a second side that is opposite the first side of the first arm member.

4. The camera stabilizer according to claim 1 wherein the first arm member and the second arm member are generally disposed in the horizontal plane and the vertical pivot arm has a first tubular part that is telescopically attached to a second tubular part.

5. The camera stabilizer according to claim 1 wherein the vertical pivot arm has one end rotatably attached to a crank arm and the second arm member is rotatably attached to the crank arm, the vertical pivot arm is pivotable about a pivot axis so that rotation of the crank arm about the pivot axis shifts the stabilizing mass member in a horizontal direction relative to the first arm member.

6. The camera stabilizer according to claim 1 wherein the second arm member is movable into a collapsed position that is substantially parallel to the first arm member.

7. The camera stabilizer according to claim 1 wherein the handle comprises a hand grip portion that is pivotably connected to the first arm member via a universal joint so that the hand grip portion is swingable relative to the first arm member.

* * * * *